(12) United States Patent
Chan et al.

(10) Patent No.: US 7,702,660 B2
(45) Date of Patent: Apr. 20, 2010

(54) I/O FREE RECOVERY SET DETERMINATION

(75) Inventors: Wilson Wai Shun Chan, San Mateo, CA (US); Vinay Srihari, South San Francisco, CA (US); Tak Fung Wang, Redwood City, CA (US); Tolga Yurek, Foster City, CA (US); Angelo Pruscino, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 149 days.

(21) Appl. No.: 11/638,058

(22) Filed: Dec. 12, 2006

(65) Prior Publication Data

US 2008/0140733 A1    Jun. 12, 2008

(51) Int. Cl.
*G06F 12/00* (2006.01)

(52) U.S. Cl. ..................................... 707/202
(58) Field of Classification Search ................. 707/202
See application file for complete search history.

(56) References Cited

U.S. PATENT DOCUMENTS

| | | | |
|---|---|---|---|
| 5,423,037 A | 6/1995 | Hvasshovd | |
| 5,907,849 A | 5/1999 | Dias et al. | |
| 5,951,695 A | 9/1999 | Kolovson | |
| 5,983,361 A | 11/1999 | Lee et al. | |
| 6,105,148 A | 8/2000 | Chung et al. | |
| 6,169,988 B1 | 1/2001 | Asakura | |
| 6,185,699 B1 | 2/2001 | Haderle et al. | |
| 6,530,035 B1 | 3/2003 | Bridge | |
| 6,594,676 B1 * | 7/2003 | Moore | 707/202 |
| 6,658,589 B1 | 12/2003 | Taylor | |
| 7,178,050 B2 | 2/2007 | Fung et al. | |
| 2001/0039550 A1 | 11/2001 | Putzolu | |
| 2001/0047270 A1 | 11/2001 | Gusick et al. | |
| 2003/0154236 A1 | 8/2003 | Dar et al. | |
| 2003/0220974 A1 | 11/2003 | Curran et al. | |
| 2003/0236834 A1 | 12/2003 | Gottfried | |
| 2004/0098371 A1 | 5/2004 | Bayliss et al. | |
| 2004/0215640 A1 | 10/2004 | Bamford et al. | |

FOREIGN PATENT DOCUMENTS

EP    0772319 A2    5/1997

OTHER PUBLICATIONS

Dongho Lee et al., Checkpointing Schemes for fast restart in Main Memory Database Systems, 1997, IEEE, 663-668.
Tirthankar Lahiri et al, Fast-Start: quick fault recovery in oracle, Jun. 2001, ACM, pp. 593-598.
E. Panagos et al, Synchronization and recovery in a client-server storage system, Aug. 1997, ACM, pp. 209-223.
Kuo-Feng Ssu et al., An adaptive checkpointing protocol to bound recovery time with message logging, Oct. 19-22, 1999, IEEE, 9 pages.

* cited by examiner

*Primary Examiner*—Don Wong
*Assistant Examiner*—Michael Le
(74) *Attorney, Agent, or Firm*—Hickman Palermo Truong & Becker LLP; Eric L. Sutton

(57) ABSTRACT

In a multi-node database system, a list of data blocks to perform recovery operations on in the event of failure of a given node is dynamically maintained on another node. List is available when the given node fails, and allows the database to be made available more quickly.

18 Claims, 4 Drawing Sheets

/O FREE RECOVERY SET DETERMINATION

FIELD OF THE INVENTION

The present invention relates to database systems and particular maintaining availability during a failure of the database system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A multi-node database management system ("DBMS") is made up of interconnected nodes that share access to shared data resources. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid. A grid is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients. Among other functions of database management, a database server governs and facilitates access to a particular database, processing requests by clients to access the database.

Resources from multiple nodes in a multi-node database system can be allocated to running a particular database server's software. Each combination of the software and allocation of the resources from a node is a server that is referred to herein as a "server instance" or "instance".

Transaction Processing

Like any multi-node computer, one or more of the nodes may fail. When a node fails, one or more of the surviving nodes performs failure recovery. In the database systems, this entails redoing or undoing certain changes to the database system. A redo log is scanned to determine which changes need to be redone or undone and how to redo or undo the changes.

A redo log contains redo records. Redo records record changes to a unit of data in a database (e.g. a row, a data block that stores rows) A redo record contains enough information to reproduce a change between a version of the unit of data previous to a change and a version of the unit of data subsequent to the change.

During failure recovery, much of the database is locked. Normal access to the database by the surviving nodes is prevented until it can be determined which units of data have changes that may need to redone or undone. Once this set is determined, the database is unlocked and normal access to unit of data that are not in the set is permitted.

Because the database is locked until the completion of the process of determining the set of units of data that have changes that need to be redone or undone, the completion of this process delays the full availability of the database system. Constant and complete availability of a database system is a critical feature of a multi-node database system. Therefore, there is a need to reduce the time is takes to determine the set of units of data that have changes to be redone or undone.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein is an approach that enables, in the event of a failure of a node in a multi-node system, the quick identification of a set of units of data for which recovery operations are to be performed to redo or undo changes made by the failed node. According to an embodiment, the units of data are data blocks in a database. The list of data blocks to perform recovery operations on in the event of failure of a given node is dynamically maintained on another node. The already formed list is available immediately when the given node fails, and does not have to be completely generated by scanning a redo log, allowing the database to be made available more quickly.

Illustrative Computer-System

Figure 1:
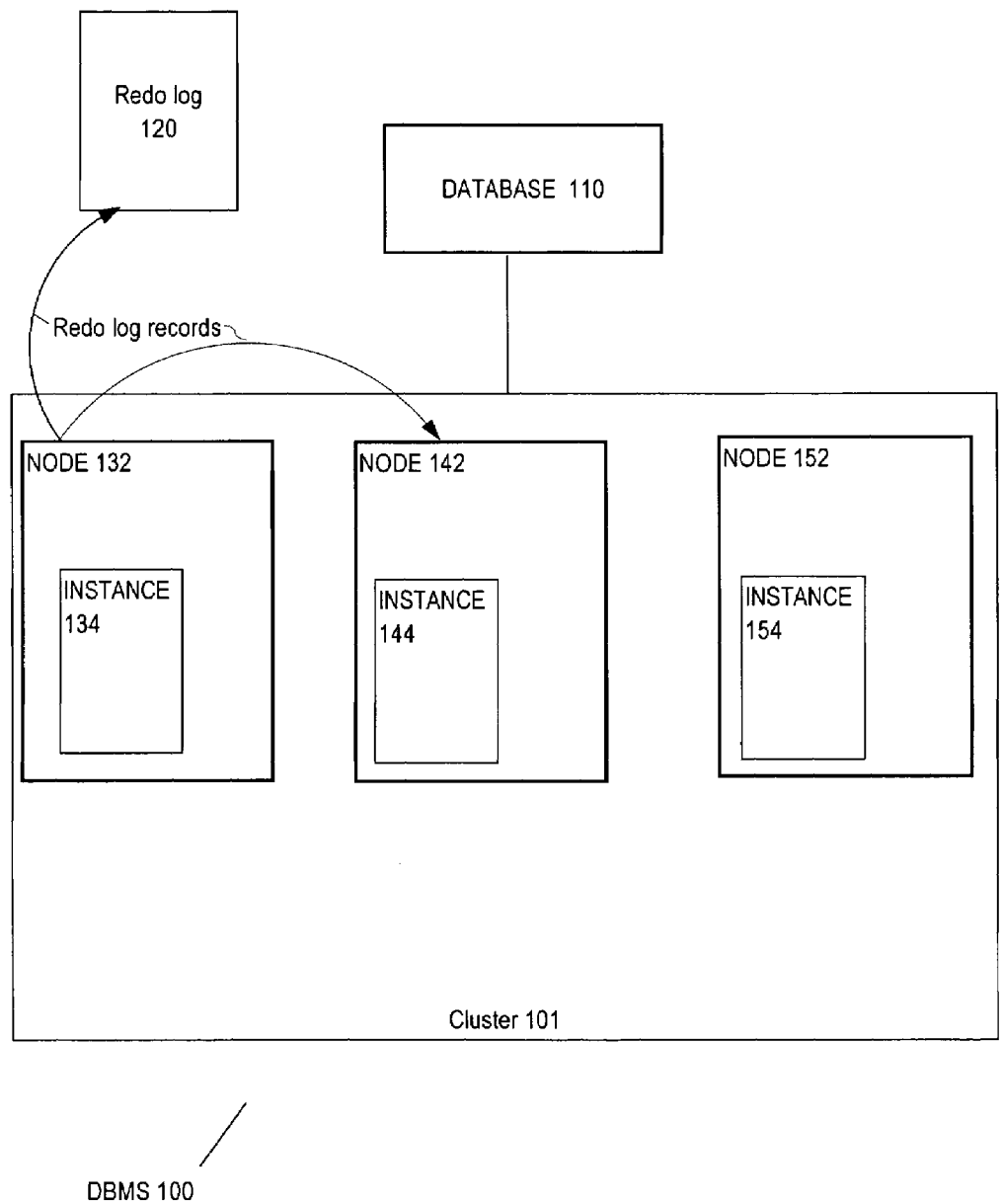
FIG. 1 is a diagram depicting a multi-node computer system that may be used to implement an embodiment of the present invention.

FIG. 1 shows a multi-node computer system that may be used to implement an embodiment of the present invention. Referring to FIG. 1, it shows multi-node DBMS 100, which comprises nodes 132, 142 and 152. Database server instances 134, 144 and 154 are hosted on nodes 132, 142 and 152, respectively, and manage access to database 110.

A database, such as database 110, is a collection of database objects. Database objects include any form of structured data. Structured data is data structured according to a metadata description defining the structure. Structured data includes relational tables, object-relational tables, object tables and/or other forms object collections, and bodies of data structured according to the Extensible Markup Language ("XML"), such as XML documents. An embodiment is not limited to any particular type of database system managing any particular type of database.

Instance 134 records changes to database 110 by generating redo log records and storing them in redo log 120. Redo log records include redo records and other kinds of records for supporting failure recovery, transaction processing and/or other functions, as shall be described in further detail. According to an embodiment, a redo record records a change to data block. Redo log records are ordered sequentially within redo log 120 according to when the redo log records are added to redo log 120.

A data block is an atomic unit of persistent storage used by a DBMS to store database records (e.g. rows of a table). When records are read from persistent storage, a data block containing the record is copied into a data block buffer in volatile memory of a DBMS. A data block usually contains multiple rows, and control and formatting information, e.g. (offsets to sequences of bytes representing rows or other data structures, list of transactions affecting a row).

While an embodiment is illustrated herein based on redo records that record changes to data blocks, an embodiment of the present invention may be based on redo records that record changes to any type of unit of data in a database.

DBMS 101 is transaction-oriented. A transaction is a logical unit of work that is performed as an atomic unit. In the context of database systems, the database must reflect all the changes made by a transaction, or none of the changes made by the transaction to ensure the integrity of the database. Consequently, none of the changes made by a transaction are permanently applied to a database until the transaction has been fully executed. A transaction is said to "commit" when the changes made by the transaction are made permanent. A transaction is active if the transaction has not been committed, aborted, or otherwise terminated.

In order for a transaction to make a change to a row, the data block for that row is loaded into a buffer in volatile memory. The in-memory version of the data block ("buffered data block") is changed and a redo record recording the change is generated. The redo record and the data block, as changed, are eventually written into persistent storage. Normally, the redo record is written to persistent storage before the changed buffered data block. A buffered data block that has been changed and not stored persistently since changed is referred to as being dirty with respect to that change.

Through a process referred to herein as checkpointing, dirty data blocks of a database server are written to persistent storage and a checkpoint record is written to the redo log. For any redo record before the latest checkpoint, the data block with the changes recorded by the redo record has been written to persistent storage and is no longer dirty (at least with respect to any changes for any redo record preceding the checkpoint record). For any redo records occurring after the checkpoint, the corresponding changed data block may or may not have been written to persistent storage. The redo log records occurring in the redo log before a checkpoint record are referred to herein as being checkpointed.

During failure recovery processing, recovery operations are performed on data blocks that may be dirty. These set of data blocks are referred to herein as the recovery set. In general, before recovery operations are commenced for the recovery set, the recovery set is determined (an operation referred to herein as "recovery set determination") and write locks are obtained on the set's members (an operation referred to herein as "recovery set lock out"). The database is locked until completion of the recovery set determination and lock out. After completion, the database is unlocked and data blocks that are not in the recovery set become available for normal operations e.g. for read operations to compute queries and updating by DML ("Data Manipulation Language") operations.

Dynamically Maintaining the Recovery Set

Figure 2:
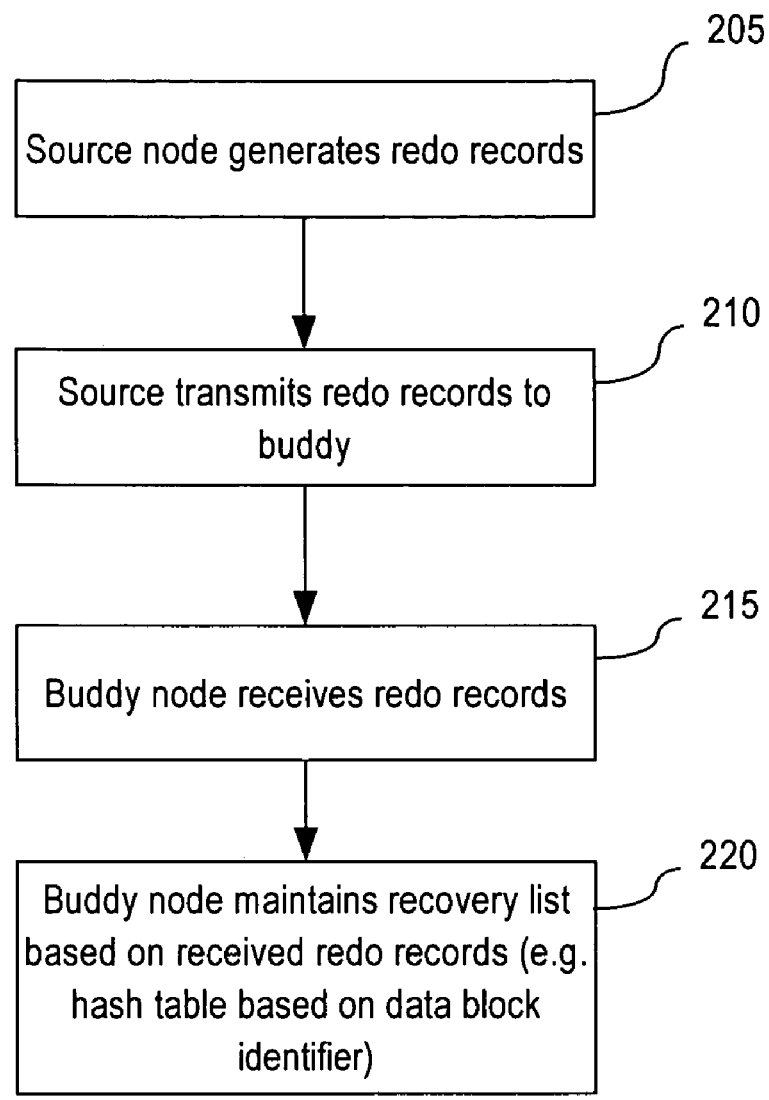
FIG. 2 is a flowchart showing a procedure for maintaining a recovery list on a buddy node according to an embodiment of the present invention.

According to an embodiment, recovery set determination is performed continually and dynamically. The recovery set for a node is tracked by dynamically maintaining on another node ("buddy node") a list of the members of the recovery set ("recovery list"). The recovery list is maintained while and in response to changing data blocks and/or generating redo records. FIG. 2 shows a procedure for maintaining a recovery list on a buddy node. The steps are illustrated using DBMS 101.

Referring to FIG. 2, instance 134 on node 132 generates redo log records (at 205) and transmits the redo log records to instance 144 on buddy node 142 (at 210). Instance 144 receives the redo log records (at 215) and maintains the recovery list based on the redo log records (at 220).

For example, when instance 134 receives redo records for data blocks, it adds entries for the data blocks to the recovery list. When instance 134 receives a check point record, it removes all the entries from the recovery list.

If instance 134 fails, the recovery set is already known; it is defined by the recovery list maintained on buddy node 142. The redo log does not have to be scanned from the last checkpoint for recovery set determination. The recovery set lock out, the releasing of the locked database, and the commencement of recovery operations on the recovery set, is not delayed by scanning the redo log from the latest check point record.

Illustrative Failure Recovery Procedure

Figure 3:
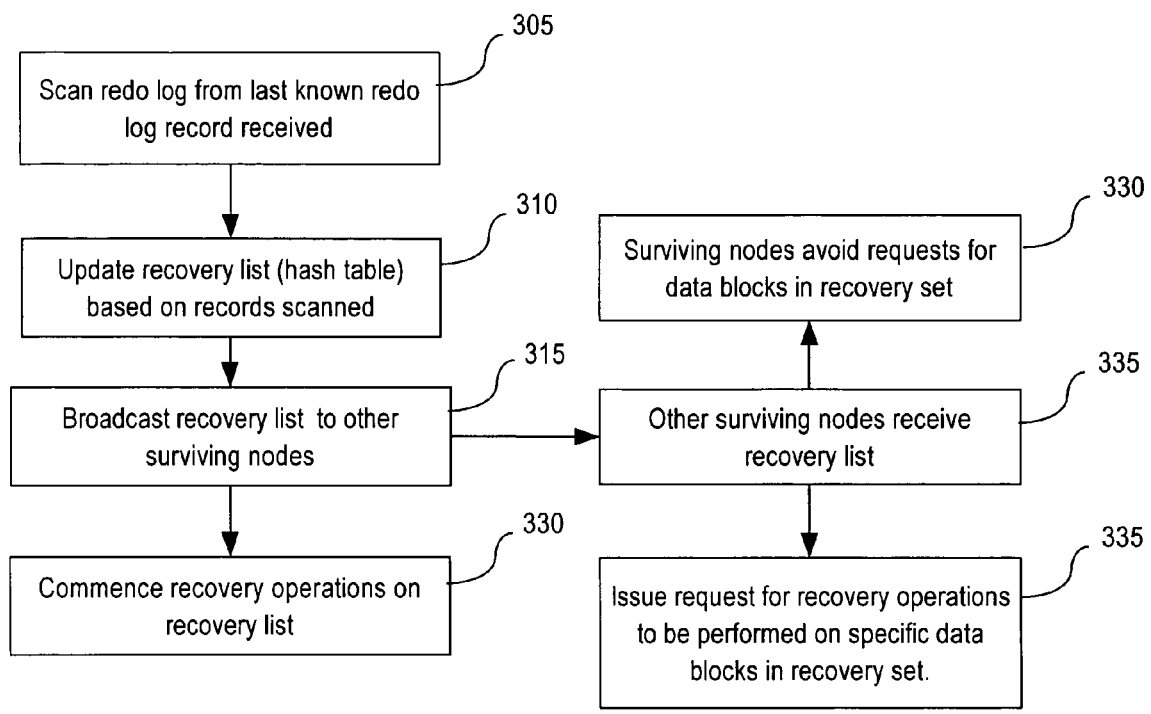
FIG. 3 is a flowchart illustrating operations performed for failure recovery using a recovery list dynamically maintained on a buddy node, according to an embodiment of the present invention.

FIG. 3 is a diagram illustrating operations performed for failure recovery using a recovery list dynamically maintained on a buddy node. The steps are illustrated using DBMS 100, in which instance 134 fails. In response to detecting or determining the failure, the other instances on the other nodes in cluster 101 perform the following procedure.

Referring to FIG. 3, instance 144 on buddy node 142 scans the redo log 120 (at block 305) from the last redo log record known by instance 134 to have been generated by instance 134. According to an embodiment, the last known redo log record is the last or latest redo log record transmitted by instance 134 to instance 144. It is possible instance 134 generated and stored redo log records in redo log 120 that were not transmitted to instance 134. Redo log 120 is scanned from the last known redo log record to capture such untransmitted redo log records. Typically, the number of redo log records scanned from the last known redo log record is far less than the number that would have to scanned from the latest check point record, as would be done if performing recover set determination from scanning redo log 120 in this way. Based on the redo log records scanned after the last known redo log record, instance 144 updates the recovery list.

Instance 134 on buddy node 142 then transmits the recovery list to other surviving nodes (at block 315). After the other surviving nodes receive the recovery list, the other surviving nodes may use the list for various purposes.

One such purpose is to prevent the other surviving nodes from requesting locks on data blocks that are locked for recovery operations (see block 330). Even though these data blocks are protected by a write lock and requests for locks by the other surviving nodes will be blocked, overhead is nevertheless incurred by the other surviving nodes requesting locks. Causing the other surviving nodes to forego such requests avoids this kind of overhead.

On-Demand Recovery

According to an embodiment, an instance needing a data block subject to recovery set lock out may issue a request that the recovering operations be performed on specific data blocks. In response to receiving the request, an instance performing recovery operations on the data blocks performs recovery operations on the data blocks requested. Without such a request, the recovery of the requested data blocks might occur at a later time. In fact, the node needing the data block may not know when the recovery operations were performed on the needed data blocks unless it undertook some measure entailing additional overhead, such as attempting to acquire a lock on the needed data blocks.

Continuing with the current example, instance 144 is performing recovery operations on a recovery set (in another embodiment, more than instance may be performing recovery operations). Instance 154 examines the recovery list to determine that a certain set of data blocks to which the instance requires access are in the recovery list. Instance 154 therefore issues a request to instance 144 to perform on-demand recovery operations on the certain set of data blocks. In response to receiving the request, instance 144 performs a "redo log record retrieval operation", an operation in which instance 144 retrieves redo log records needed to perform the recovery operations. In general, a redo log retrieval operation involves finding and retrieving the redo log records in the redo log that correspond to the certain data blocks. A way to perform a redo log record retrieval operation would be to scan the redo log 120 from the last checkpoint record to seek out and retrieve redo log records recording changes to these data blocks.

According to an embodiment of the present invention, buddy node 144 maintains a data structure that may be used to move quickly to determine what redo records are associated with the certain data blocks. One example of such a data structure is a hash table; however, an embodiment is not limited to use of a hash table as the type data structure used to quickly to determine what redo records are associated with data blocks.

For example, buddy node 144 maintains a hash table, each entry being associated with an output value ("hash value") of a hash function. The input of the hash function is an identifier of a data block. Thus, each data block is associated with the hash value generated for the data block's identifier. Each hash table entry is associated with a hash value and includes redo records of data blocks associated with the hash value of the entry. Once a redo record is checkpointed, the redo record may be removed from the hash table.

When instance 144 receives a request issued by instance 154 to perform on-demand recovery operations on a certain set of data blocks, instance 144 accesses the hash table to determine what redo records are needed for recovery operations. The hash table entries store redo log record identity or location information that allows redo log 120 to be accessed efficiently to retrieve particular redo log records efficiently.

Other Forms of Input for Maintaining Recovery List

According to an embodiment, a buddy instances maintains a recovery list based on redo log records transmitted to it by another instance. However, this is not the only way to generate information needed to maintain the recovery list. A buddy instance may retrieve the redo log records from a redo log used by the other node, continually scanning the tail of the redo log for newly added records. Or, the other instance may send a list that contains entries that identify redo log records but that does not contain entire copies of redo log records.

Hardware Overview

Figure 4:
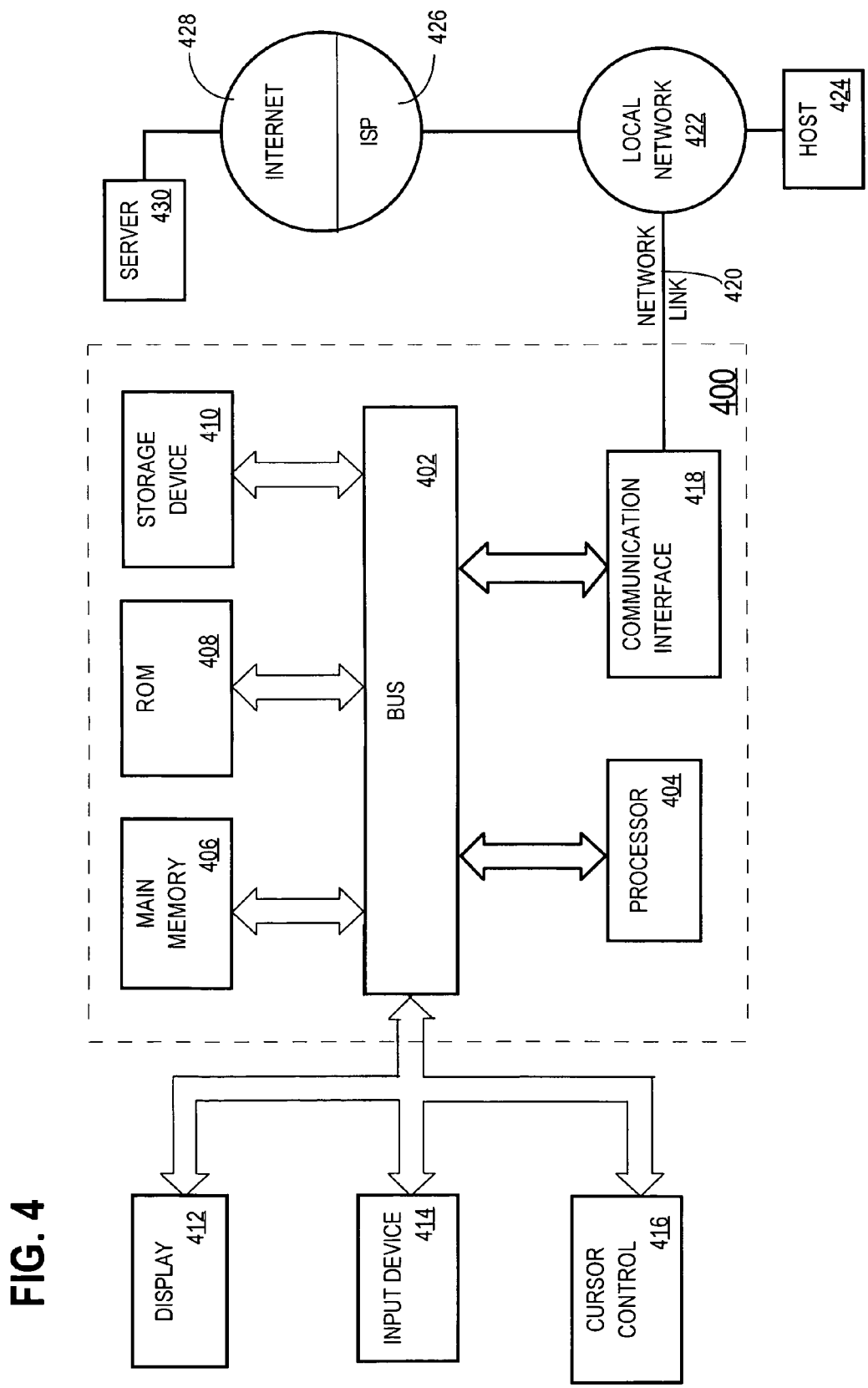
FIG. 4 is a diagram depicting a computer system that may be used in an implementation of an embodiment of the present invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    a first node of one or more processors generating redo log records that include redo records, each redo record of said redo records recording a change to a unit of data of a database;
    wherein a multi-node computer system comprises said first node and a second node of one or more processors;
    before the first node fails, said second node maintaining a list of units of data changed by certain redo records of said redo records; and
    after the first node fails, determining which units of data of said database to perform recovery operations without scanning the certain redo records of said redo records, wherein the determining is performed at least in part by reading said list of units of data.

2. The method of claim 1, wherein in response to detecting a failure of said first node, said second node broadcasting said list to one or more other nodes.

3. The method of claim 2, wherein said one or more other nodes forego requesting locks on certain units of data based at least in part on said list.

4. The method of claim 2, wherein said one or more other nodes determine which particular units of data to request on-demand recovery operations based at least in part on said list.

5. The method of claim 1, wherein said second node maintains said list based at least in part on information in the certain redo records.

6. The method of claim 1,
    wherein the steps include said first node transmitting copies of said certain redo records to said second node; and
    wherein said second node maintains said list of units based at least in part on information in said copies.

7. A method, comprising:
    a first node of one or more processors in a multi-node computer system generating redo log records that include redo records, each redo record of said redo records recording a change to a data block;
    wherein the multi-node computer system comprises said first node and a second node of one or more processors;
    before detecting a failure of said first node, a second node maintaining certain data that associates certain data blocks with certain redo records that record changes to said certain data blocks; and
    after detecting said failure of said first node, identifying the certain data blocks without scanning the certain redo records, wherein the identifying is performed at least in part by reading said certain data.

8. The method of claim 7, wherein the steps further include:

after detecting said failure, receiving a request to perform on-demand recovery operations on said certain data blocks; and determining which redo records are required for said on-demand recovery operations based at least in part on said certain data.

9. The method of claim 8, wherein said certain data includes a hash table with a hash function that maps a data block to an entry in the hash table; and wherein each entry of said hash table is associated with one or more redo records that record changes to a data block mapped to said each entry.

10. A volatile or non-volatile machine-readable medium storing one or more sequences of instructions which, when executed by one or more processors, causes the one or more processors to perform:

a first node of one or more processors generating redo log records that include redo records, each redo record of said redo records recording a change to a unit of data of a database;

wherein a multi-node computer system comprises said first node and a second node of one or more processors;

before the first node fails, said second node maintaining a list of units of data changed by certain redo records of said redo records; and after the first node fails, determining which units of data of said database to perform recovery operations without scanning the certain redo records of said redo records, wherein the determining is performed at least in part by reading said list of units of data.

11. The volatile or non-volatile machine-readable medium of claim 10, wherein in response to detecting a failure of said first node, said second node broadcasting said list to one or more other nodes.

12. The volatile or non-volatile machine-readable medium of claim 11, wherein said one or more other nodes forego requesting locks on certain units of data based at least in part on said list.

13. The volatile or non-volatile machine-readable medium of Claim 11, wherein said one or more other nodes determine which particular units of data to request on-demand recovery operations based at least in part on said list.

14. The volatile or non-volatile machine-readable medium of claim 10, wherein said second node maintains said list based at least in part on information in the certain redo records.

15. The volatile or non-volatile machine-readable medium of claim 10, further causing the one or more processors to perform:

said first node transmitting copies of said certain redo records to said second node; and wherein said second node maintains said list of units based at least in part on information in said copies.

16. A volatile or non-volatile machine-readable medium storing one or more sequences of instructions which, when executed by one or more processors, causes the one or more processors to perform:

a first node of one or more processors in a multi-node computer system generating redo log records that include redo records, each redo record of said redo records recording a change to a data block;

wherein the multi-node computer system comprises said first node and a second node of one or more processors;

before detecting a failure of said first node, a second node maintaining certain data that associates certain data blocks with certain redo records that record changes to said certain data blocks; and after detecting said failure of said first node, identifying the certain data blocks without scanning the certain redo records, wherein the identifying is performed at least in part by reading said certain data.

17. The volatile or non-volatile machine-readable medium of claim 16, further causing the one or more processors to perform:

after detecting said failure, receiving a request to perform on-demand recovery operations on said certain data blocks; and determining which redo records are required for said on-demand recovery operations based at least in part on said certain data.

18. The volatile or non-volatile machine-readable medium of claim 17, wherein said certain data includes a hash table with a hash function that maps a data block to an entry in the hash table; and wherein each entry of said hash table is associated with one or more redo records that record changes to a data block mapped to said each entry.

* * * * *